No. 884,361. PATENTED APR. 14, 1908.
F. D. BROGA.
MEAT HOOK.
APPLICATION FILED SEPT. 17, 1904.
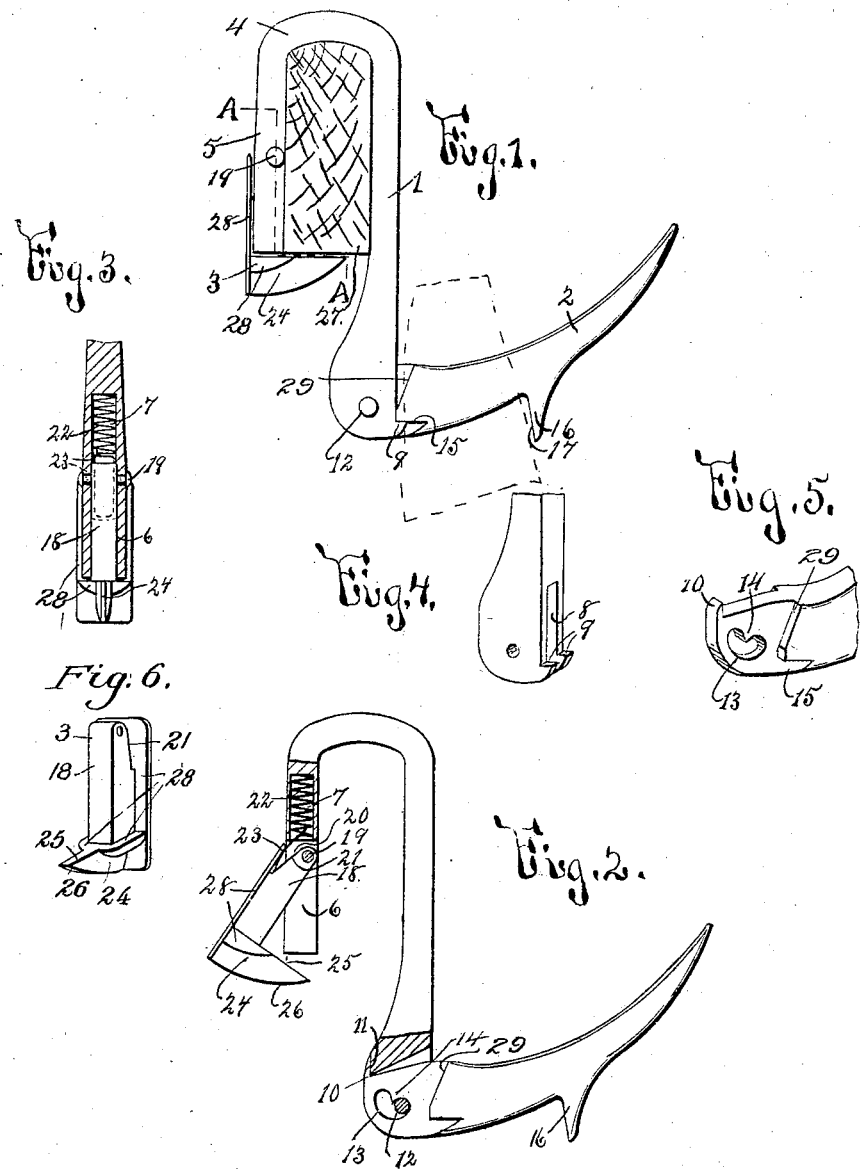
WITNESSES:
Chas. H. Young.
Emma Seemiller
INVENTOR
Franklin D. Broga
BY
Hey & Parsons
ATTORNEYS

UNITED STATES PATENT OFFICE.

FRANKLIN D. BROGA, OF ONEIDA, NEW YORK.

MEAT-HOOK.

No. 884,361. Specification of Letters Patent. Patented April 14, 1908.

Application filed September 17, 1904. Serial No. 224,804.

*To all whom it may concern:*

Be it known that I, FRANKLIN D. BROGA, of Oneida, in the county of Madison, in the State of New York, have invented a certain new and useful Meat-Hook, of which the following is a specification.

My invention has for its object the production of a hook which is especially applicable for supporting meat, is particularly simple in construction and practical in use, and permits the ready removal of a quarter, or other piece, of meat and its inclosing wrapper engaged with said hook; and to this end, it consists in the combination, construction and arrangement of the component parts of a hook, as hereinafter fully set forth and pointed out in the claims.

In describing this invention, reference is had to the accompanying drawing, forming part of this specification, in which like characters designate corresponding parts in all the views.

Figure 1 is a side elevation of my hook, illustrated as supported on a cross-bar, the hook-member being shown in operative position, and the upper end of a quarter of meat being indicated by dotted lines as operatively engaged with said member. Fig. 2 is an elevation, partly in section, of said hook. Fig. 3 is a sectional view, partly in elevation, on line A—A, Fig. 1. Figs. 4, 5 and 6 are isometric views of detached parts.

This hook consists essentially of a shank 1, a hook-member 2, and an engaging member 3.
The upper portion of the shank 1 has a lateral extension 4 formed with a depending end 5, which is provided with a slot 6 extending upwardly from the end face of said depending end, and through the inner and outer sides thereof, and is also provided with a socket 7 extending upwardly from the top of the slot 6. The lower portion of the shank 1 is formed with a slot 8 extending upwardly from its bottom, or end, edge and through the inner and outer sides thereof, and is also formed with shoulders 9 projecting from the front, or outer, face of said lower portion at opposite sides of the slot 8.

As best seen in Figs. 1 and 2, the hook-member 2 is formed with a projecting free end which extends upwardly when the hook-member is in its normal, or operative, position. The other end of the hook-member 2 is reduced in thickness, is movable in the slot 8, is provided with upwardly extending means as a shoulder 10, for engaging a face 11 on the shank 1 and preventing downward movement of the free end of the hook-member, and is secured to the lower portion of the shank by a pivot 12 passed through a slot 13 in said end of the hook-member. The lower wall of the slot 13 is formed concave, and the upper wall thereof is provided with a shoulder 14, depending toward said lower wall and normally arranged at one side of the pivot 12, as shown in Fig. 2, said shoulder 14 having diverging sides leading from its inner extremity. Said hook-member 2 is also provided with shoulders 15 arranged in advance of the slot 13 for engaging the upper faces of the shoulders 9 of the shank, and with a shoulder or extension 16 independent of, and separated from, the shank 1 and depending from the lower edge of said hook-member intermediate of its ends, and having its face 17 opposed to the shank substantially upright, and its opposite face diverging upwardly from the face 17.

As seen in Figs. 1, 2, and 5, the hook-member is formed with upwardly extending surfaces 29 located above the shoulders 15 and inclining away from the front faces of the shank on opposite sides of the slot 8, said surfaces 29 being normally spaced apart from the front faces of the shank, and movable into engagement with the said faces when the hook-member is raised preliminary to its downward movement. By reason of the separation of the surfaces 29 and the front faces of the shank, no slight movement of the hook-member, such as is caused by jarring, will dislocate the hook-member, as it is first necessary that said member be lifted until the faces 29 engage the shank, before the hook-member is in position to be moved endwise to shift the shoulder 14 over the pivot 12, and also to free the faces 15 from the shoulders 9.

The meat or other article being engaged with my hook moves lengthwise of the projecting free end of the member 2 past the shoulder 16, and when in normal position engages the face 17 of said shoulder. Providing it is desired to remove the meat or other article, the same is lifted upwardly slightly, thus rocking the hook-member 2 on its pivot 12 for disengaging the shoulder 10 from the face 11, and after the disengagement of these parts 10, 11 the meat or other article is forced sidewise for moving the member 2 relatively to its pivot 12 in a plane at an angle to the rocking movement of said member 2, and thereby arranging the shoulders 15 in front of the shoulders 9, and causing the shoulder 14 to pass to the other side of the pivot 12, whereupon the hook-member swings on said pivot, and as the free end of said member moves downwardly, the weight of the meat or other article facilitates the disengagement thereof from the hook-member.

The engaging member 3 is provided with a part 18 which extends downwardly from its upper end, is formed of less thickness than other portions of said member, is movable in the slot 6, and is secured by a pivot 19 at its upper end to the depending end 5 of the upper portion of the shank 1. A suitable slot 20 extends downwardly from the upper edge of the engaging member in the part 18, beneath the pivot 19, and is provided with a lengthwise bearing surface 21. A coiled spring 22 is arranged within the socket 7 and is provided with a depending spring arm 23 disposed in a plane substantially parallel to the extension 5 and arranged in the slot 20. This arm 23 engages the face 21 below the pivot 19 and normally holds the engaging member in its operative position, as illustrated in Fig. 1. Said engaging member 3 is provided at its lower end with a lateral branch 24 projecting toward the main body of the shank 1 and having its upper face 25 substantially flat and its lower face 26 extended upwardly toward the free end of said branch 24. When the hook-member is in operative position, the face 25 engages the lower edge of a supporting beam or cross-bar 27, Fig. 1, and as will be obvious to those skilled in the art, the inclined face 26 facilitates the ready engagement of the hook with the cross-bar by causing the engaging member 3 to swing outwardly against the action of the spring 22 as the engaging member is pressed downwardly against the upper edge of said cross-bar. The engaging member 3 prevents the upward movement of the hook relatively to its supporting cross-bar and thus obviates undue detachment of the hook. Said engaging member 3 is also provided with shoulders 28 which project laterally beyond the part 18 of the engaging member and the opposing edges of the extension 5, and coact with said opposing edges for limiting the movement of the engaging member 3 under the influence of its spring, and also tend to support articles, as other hooks, resting upon the sides of the shank, when the hooks are detached from the supporting bar piled promiscuously, and thus prevent the weight of such articles from bending the walls of the slot 6 and interfering with the movement of the engaging member. An engaging member, and a spring, of the described construction are economically manufactured and assembled and add materially to the practicability of my hook.

The construction and operation of my hook will now be readily understood upon reference to the foregoing description and the accompanying drawings, and it will be noted that more or less change may be made in the component parts thereof without departing from the spirit of my invention.

Having thus fully described my invention, what I claim as new and desire to secure by Letters Patent, is:—

1. A hook comprising a shank, and a hook-member pivoted to the shank and having a projecting free end movable downwardly from its normal or operative position and movable upwardly slightly preliminary to its downward movement, said hook-member being provided with means for engaging the shank and normally preventing downward movement of the free end of the hook-member, and with a surface above and in advance of the pivot for engaging the front face of the shank at the end of the upward movement of the hook-member, and thereby effecting the disengagement of said means and the shank, said surface being normally spaced apart from the shank, substantially as and for the purpose described.

2. A hook comprising a shank, and a hook-member pivoted to the shank and having a projecting free end movable downwardly from its normal or operative position and being movable upwardly slightly preliminary to its downward movement, said hook-member being formed with a slot for receiving the pivot and with a shoulder having diverging sides projecting into the slot for engaging the pivot during the movement of the hook-member, and thereby automatically forcing said hook-member into and out of its normal or operative position for preventing the hook-member from assuming a position intermediate of its normal and extreme abnormal positions, said hook-member being also provided with means for engaging the shank and normally preventing downward movement of the free end of the hook-member, and with a surface above and in advance of the pivot for engaging the opposing surface of the shank at the end of the upward movement of the hook-member and thereby effecting the disengagement of said means and the shank, said surface being normally spaced apart from the shank, substantially as and for the purpose specified.

3. In a hook, the combination with a shank comprising a main body having a lateral extension formed with a depending end provided with a slot extending upwardly from the end face of said end and through the inner and outer sides thereof, and with a socket extending from said slot, and an engaging member pivoted to said depending end and movable in the slot therein; of a coiled spring arranged in the socket and having a spring arm disposed substantially parallel to said depending end and coacting with the engaging member, and a hook-member supported by the shank, substantially as and for the purpose described.

4. In a hook, the combination with a shank comprising a main body having a lateral extension formed with a depending end provided with a slot extending upwardly from the end face of said end and through the inner and outer sides thereof, and with a socket extending from said slot, and an engaging member having its upper end pivoted to said depending end and movable in the slot therein and provided with a slot extending downwardly from its upper face; of a coiled spring arranged in the socket and having a spring arm extending substantially lengthwise of the slot in the engaging member and coacting with said engaging member, and a hook-member supported by the shank, substantially as and for the purpose set forth.

5. In a hook, the combination with a shank comprising a main body having a lateral extension formed with a depending end provided with a slot extending upwardly from the end face of said end and through the inner and outer sides thereof, and with a socket extending upwardly from said slot, and an engaging member having its upper end pivoted to said depending end and movable in the slot therein, said engaging member being provided with a slot extending downwardly from its upper face below the pivot therefor, and with a bearing surface extending lengthwise of the slot, and being provided at its lower end with a lateral branch; of a coiled spring arranged in the socket and having a spring arm disposed substantially parallel to the depending end of the shank and arranged in the slot in the engaging member and coacting with the bearing surface thereof below the pivot for the engaging member, and a hook-member supported by the shank, substantially as and for the purpose described.

6. In a hook, the combination with a shank comprising a main body having a lateral extension formed with a depending end provided with a slot extending upwardly from the end face of said end and through the inner and outer sides thereof; of an engaging member pivoted to the depending end and provided with a part movable in the slot and with lateral shoulders for limiting the movement of the engaging member and relieving the sides of the slot from the weight of articles resting upon the sides of the shank and a hook-member supported by the shank, substantially as and for the purpose specified.

In testimony whereof, I have hereunto signed my name in the presence of two attesting witnesses, at Syracuse, in the county of Onondaga, in the State of New York, this 9th day of September, 1904.

FRANKLIN D. BROGA.

Witnesses:
D. LAVINE,
E. SEEMILLER.